United States Patent Office 3,061,204
Patented Oct. 30, 1962

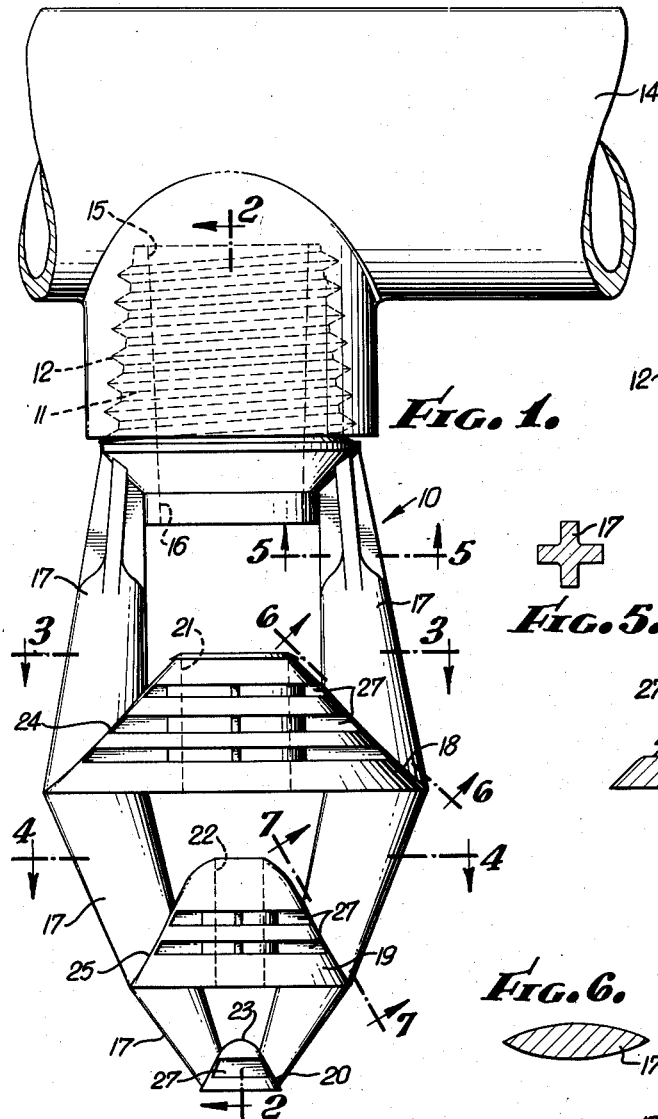

3,061,204
WATER SPRAY NOZZLE
William F. MacInnes, Whittier, and Howard Curtis Schafer, Torrance, Calif., assignors to The Fluor Corporation, Ltd., Los Angeles, Calif., a corporation of California
Filed Mar. 30, 1961, Ser. No. 100,783
2 Claims. (Cl. 239—500)

This invention has to do with improvements in spray nozzles adaptable particularly for use in water cooling towers wherein water sprayed from the nozzles is brought into contact with cooling air passing through the tower.

The invention in certain of its aspects has been occasioned by our desire to improve nozzle performance in relation to the operation of mechanical draft cooling towers wherein the water is sprayed into the path of air being displaced upwardly through the tower and to the atmosphere, through an appropriate mist eliminator at the top of the cooling chamber. The upward flow and velocity of the cooling air tends to entrain and carry some of the sprayed water particles to the mist eliminator, and frequently the latter may become overloaded and caused to pass water to the atmosphere, where the nozzle spray pattern and direction are conducive to excessive entrainment. Such is found to be the case using conventional nozzles which tend to disperse the spray horizontally in an effort to gain outward distribution, and where the falling energy of the water droplets is overcome by the upwardly flowing air stream to an extent that excessive entrainment occurs.

Our primary object is to provide an improved spray nozzle assembly so designed as to effect downward direction of the spray pattern, without sacrificing desired fine particle division and outward distribution of the spray, in a manner such that the downward components of the droplet energies will be sufficient to resist any excessive entrainment.

In accordance with the invention, the present unitized nozzle is composed of a vertical series of spaced, axially aligned baffles having essentially conical surfaces, i.e. surfaces extending downwardly and outwardly from substantially the innermost locus of water impingement against them. Thus the water is deflected and directed not horizontally, as in the case of essentially flat plates, but downwardly and outwardly as and for the reasons stated. As will appear, the angularities of the conical surfaces preferably vary in downwardly progression, as do the diameters of the baffle orifices which are aligned with the delivery inlet above.

A further object of the invention is to provide the baffles with novel surface configurations in the form of arcuate recesses or grooves acting to hold the impinging water on the baffle surfaces and thus insure its direction downwardly and outwardly, and presenting a further advantage in facilitating manufacture of the nozzle assembly in a plastic mold operation.

Other features of the invention have to do with the configuration of the baffle-supporting arms, which as will later be described, are given streamlined surface shapes allowing the baffled water passing and divided by the arms to converge at the outside and thus restore an essentially continuous circular pattern.

All the features and objects of the invention as well as the details of an illustrative and preferred embodiment will be more fully understood by the detailed description of the accompanying drawing in which:

FIG. 1 is a view showing the nozzle in elevation;
FIG. 2 is a vertical section taken on line 2—2 of FIG. 1;
FIGS. 3 and 4 are cross sectional views taken respectively on lines 3—3 and 4—4 of FIG. 1; and
FIGS. 5, 6 and 7 are fragmentary sections respectively at lines 5—5, 6—6 and 7—7 of FIG. 1, illustrating the cross sectional configurations of the baffle supporting arms.

The spray nozzle generally indicated at 10, preferably is a one piece structure molded of suitable plastic material presenting the advantages of low cost and complete resistance to corrosion or other deteriorative conditions. As illustrated, the nozzle comprises a top neck portion 11 having threads 12 adapted to be screwed into a water header diagrammatically indicated at 14, and which carries a series of the nozzles. Neck 11 contains a water passage 15 having an outlet 16, the diameter of which is larger than the diameters of the nozzle passages below.

Molded integrally with the neck 11 is a pair of opposed arms 17 carrying a vertical series of baffles 18, 19 and 20, typically three in number. The baffles are essentially conical or frusto-conical in shape, and are molded integrally with the arms 17 so as to be intersected thereby along substantially the illustrated radial extents of the baffles to form a strongly integrated assembly. Baffles 18 and 19 contain respectively larger and smaller diameter water passages 21 and 22 axially aligned with discharge openings 16 of the neck and with the rounded top surface 23 of the bottom baffle 20. The conical surfaces 24 and 25 and baffles 18 and 19 extend respectively at lesser and greater angularities so that the upper baffle tends to project its spray pattern outwardly above and beyond the pattern effected by the intermediate baffle, and without interferences of the patterns. The surface slope of the lowermost baffle 20 may correspond substantially to the angularity of the intermediate baffle surface.

Assuming FIG. 1 to show the nozzle at full scale and designed to operate over a range of 1 to 10 p.s.i.g. header water pressure, typically the cone angle of baffle 18 may be about 45° with the two lower baffles surface angularities at about 60°. The diameters of passages 22, 21 and 16 are in a relationship of about 1 to 2 to 2.8 diameters.

The conical surfaces of the baffles are shown to contain grooves or recesses 27 extending arcuately to locations at or near the arms 17, and in the case of the plurally grooved baffles 18 and 19, the grooves are shown to have substantially the same internal diameter. As previously indicated, such grooving of the baffles presents the dual advantages of holding the water and directing this water along the baffle surfaces, and to facilitate unitized molding of the entire nozzle by reason of heat removal from the otherwise massive baffles by mold parts corresponding to the groove configurations.

Toward their juncture with the neck 11, the arms 17 may be cross-shaped in section, see FIG. 5, but below, and as illustrated by FIGS. 6 and 7, the arms have streamlined contour in that they have curved tapers to both radial extremities. This provides for minimized disturbances of a completely circular spray pattern outwardly from the baffles.

In the functioning of the nozzle, the outer annular portion of the larger diameter water stream being projected downwardly from the neck outlet 16, is deflected at the edge 28 along the surface of baffle 18. Similarly, the outer portion of the water stream passing through the relatively larger diameter opening 21 is deflected by edge 29 along the surface 25 of baffle 19. The residual water falling through passage 22 is impinged against the top and conical surfaces of the bottom baffle 20. As will be apparent, the effect of the conical baffles is to direct the spray patterns both outwardly and downwardly in a manner such that the downward components of the droplet energies will resist the entraining tendencies of air flowing upwardly about the nozzle at the velocities ordinarily encountered in counterflow-type water cooling towers.

We claim:

1. A water spray nozzle comprising a top tubular vertical neck adapted to receive water from a header, diametrically opposed arms extending downwardly from the neck and a plurality of downwardly flared essentially conical baffles carried between and formed integrally with said arms, said baffles being vertically spaced and having decreasing diameters in downward progression, the uppermost and lower baffles having respectively larger and smaller diameter central water passing apertures aligned with a larger diameter water delivery passage in the neck, each baffle top surface being sloped throughout to direct the water downwardly and outwardly about the baffle, each of a pair of said baffles having in its conical surface a plurality of arcuate recesses extending between said arms and spaced axially of the baffle so that water initially deflected outwardly by the top surface of the baffle impinges against successive recesses of increasing radii.

2. A nozzle according to claim 1, in which said neck, arms and baffles are integrally molded of organic plastic material and said recesses have closed ends terminating near said arms.

References Cited in the file of this patent

UNITED STATES PATENTS

| | | |
|---|---|---|
| 1,153,805 | MacDonald | Sept. 14, 1915 |
| 1,509,448 | Skinner | Sept. 23, 1924 |
| 1,805,782 | Munz | May 19, 1931 |
| 1,877,046 | Phillips | Sept. 13, 1932 |
| 2,005,600 | Tappen | June 18, 1935 |
| 2,314,754 | Baird | Mar. 23, 1943 |
| 2,375,528 | De Flon | May 8, 1945 |
| 2,495,208 | Causer | Jan. 24, 1950 |
| 2,568,875 | Wethly et al. | Sept. 23, 1951 |